United States Patent [19]
Taylor

[11] 3,991,162
[45] Nov. 9, 1976

[54] ABSORPTION SYSTEM

[76] Inventor: James A. Taylor, Rte. 1, Box 652-A, Lakeland, Fla. 33803

[22] Filed: Sept. 9, 1974

[21] Appl. No.: 504,651

[52] U.S. Cl. .......................... 423/242; 423/512 A
[51] Int. Cl.$^2$ ..................................... C01B 17/00
[58] Field of Search ........................ 423/242, 512

[56] References Cited
UNITED STATES PATENTS

| | | | |
|---|---|---|---|
| 3,653,812 | 4/1972 | Schneider et al. | 423/242 |
| 3,687,624 | 8/1972 | Terrana et al. | 423/242 |
| 3,687,625 | 8/1972 | Terrana et al. | 423/242 |

*Primary Examiner*—Oscar R. Vertiz
*Assistant Examiner*—Gregory A. Heller
*Attorney, Agent, or Firm*—Stefan M. Stein

[57] ABSTRACT

The use of a 1–35%, by weight, aqueous solution of a composition of sodium pyrosulfite and sodium sulfite at a pressure of approximately one atmosphere and a temperature of 75°–155° F. to remove substantially all sulfur dioxide from gas streams containing the same. The sulfur dioxide-containing gas stream is placed in intimate contact with a plurality of progressively decreasing concentrations of said aqueous solution. Additionally, as the relative strength of successive aqueous solutions is decreased, the relative concentration of sodium pyrosulfite to sodium sulfite within each aqueous solution is inverted. That is, the first, or strongest, aqueous solution includes the largest ratio of sodium pyrosulfite to sodium sulfite, and the last, or weakest, aqueous solution includes the smallest ratio of sodium pyrosulfite to sodium sulfite.

11 Claims, No Drawings

ABSORPTION SYSTEM

BACKGROUND OF THE INVENTION

1. Field of the Invention

This invention relates to a method for removing sulfur dioxide from a gas containing the same. Specifically, this invention allows for virtually complete recovery of sulfur dioxide in a sodium system absorption reaction which may be represented as follows:

$$Na_2SO_3 + H_2O + SO_2 \rightleftharpoons 2NaHSO_3$$

$$2NaHSO_3 \rightleftharpoons Na_2S_2O_5 + H_2O$$

2. Description of the Prior Art

Contemporaneous with the sudden increase in public awareness of the necessity for maintaining high environmental quality standards in the United States, numerous apparatus and methods have been devised for improving the environmental quality of the air we breathe. Not surprisingly, industry has also recognized that by "cleaning" their exhaust gases prior to releasing them into the atmosphere, not only is air pollution reduced, but also useful by-products are oftentimes recovered. One of the most notorious of such air pollutants is sulfur dioxide, and numerous prior art patents disclose means and methods for recovering sulfur dioxide from exhaust gas streams. Such prior art methods generally disclose the use of a sodium system for removing and recovering the sulfur dioxide gas. However, for successful, efficient operation of these processes, relatively static gas flow, sulfur dioxide content and chemical solution concentrations are required. Of course, in practice such constancy is virtually unobtainable, necessarily resulting in the use of considerable and complex instrumentation and storage of scrubbing chemicals.

One such prior art process for recovering sulfur dioxide from exhaust gases is disclosed in U.S. Pat. No. 3,485,581. The process disclosed therein is basically two-step and comprises first contacting the exhaust gas with an aqueous solution of the sulfite of a metal selected from the group consisting of alkaline metals and alkaline earth metals in a reaction zone at a temperature between 100° F. and 230° F. to produce an aqueous bisulfite solution, and then passing the metal bisulfite solution through a desorption zone maintained at a temperature of between 300° and 400° F. to decompose the metal bisulfite into metal sulfite, sulfur dioxide and water. Not only would this process be extremely expensive in commercial operation by virtue of the high reaction temperatures required, but also it is only capable of removing 90–95% of the sulfur dioxide from the exhaust gas.

Another process for recovering sulfur dioxide from exhaust gases using an aqueous solution of sodium, lithium or beryllium sulfite is disclosed in U.s. Pat. No. 3,607,037. According to the disclosure of that patent, sulfur dioxide and waste gas are reacted with the sodium sulfite and aqueous solution to form an aqueous solution of sodium sulfite and sodium bisulfite. The sodium sulfite is separated, and the sodium bisulfite solution is heated to produce sodium sulfite and recoverable sulfur dioxide.

However, this process has not proved to be entirely satisfactory, for, like the process discussed in the immediately preceding paragraph, this process must also be conducted at elevated temperatures. Furthermore, the process of this invention must also be conducted at superatmospheric pressures. Obviously, these operating conditions necessarily increase the complexity and the cost of this process. Notwithstanding the complexity of this process, only about 85% of the sulfur dioxide present in the exhaust gas is removed.

Yet another process for the removal of the sulfur dioxide from gas streams is disclosed in U.S. Pat. No. 3,653,812. Much like the prior art methods already discussed, the process of this invention must also be conducted at elevated temperatures and carefully controlled pressures. Furthermore, no more than about 90% of the sulfur dioxide content of the flue gases may be recovered through the use of this process.

Thus, it is apparent that there is a need for a process by which substantially all sulfur dioxide may be removed from exhaust gases. While such a process should be capable of removing up to 99% of the sulfur dioxide content of the exhaust gas, it must also be capable of economic operation. Accordingly, such a process should be capable of being run at substantially atmospheric pressure and ambient temperature. Additionally, such a process should require minimal modification as the sulfur dioxide content of the incoming gas varies.

SUMMARY OF THE INVENTION

The present invention relates to a process for removing sulfur dioxide from a gas containing the same. The method uniquely utilizes the absorption reaction for a sodium system sulfur dioxide recovery by taking full advantage of the absorptive characteristics of sodium sulfite for sulfur dioxide. Most simply stated, the present method comprises passing the sulfur dioxide-containing gas over a plurality of dynamic plates, wherein each of the dynamic plates comprises a 1–35%, by weight, aqueous solution of sodium pyrosulfite and sodium sulfite.

The term "dynamic plates" has been selected to distinguish the absorption plates of the present method from the "theoretical plates" of a fractionating column as discussed and defined in chemical engineering literature. The performance of any actual fractionating column is best understood by comparing it with an ideal column, and such an ideal column is composed of theoretical plates. A theoretical plate fulfills the requirement that the vapor rising from the plate and passing to the plate above is in equilibrium with the liquid leaving the plate and passing to the plate below. The degree with which an actual, or "dynamic", plate, operating on a definite mixture, will approach such an ideal plate may be determined only by experiment. This degree of efficiency for the dynamic plates of the present invention has been determined and will be discussed in more detail hereinafter.

As stated above, the method of the present invention basically comprises passing sulfur dioxide-containing gas through a plurality of dynamic plates, a packed column or other absorption apparatus, comprising a 1–35%, by weight, aqueous solution of sodium pyrosulfite and sodium sulfite. Assuming, for the sake of illustration only, that a vertical countercurrent scrubbing tower is utilized, a relatively dilute solution—in terms of sodium sulfite concentration—is employed as the first dynamic plate at the bottom of the system in order to lower the initial sulfur dioxide vapor pressure. Preferably, this first dynamic plate comprises a 25–35%, by weight, aqueous solution including 21.25–33.25% sodium pyrosulfite and 1.75–3.75% sodium sulfite.

Having passed through the first dynamic plate, the sulfur dioxide-containing gas then passes through subsequent dynamic plates, each subsequent dynamic plate comprising relatively stronger solutions in terms of the sodium sulfite to sodium pyrosulfite ratio. The final dynamic plate preferably comprises a 20%, by weight, aqueous solution including 1% sodium pyrosulfite and 19% sodium sulfite.

The entire method of the present invention is conducted at approximately atmospheric pressure and at a temperature of 75°–155° F. For the method of the present invention, it has been determined that 99% of the sulfur dioxide contained in a given gas may be easily and efficiently removed by exposing the gas to 3 dynamic plates. For added safety, 4 dynamic plates may be utilized.

Of course, it can easily be seen that in order to obtain these results, a fairly pure sodium sulfite solution must be used, preferably at the top of the column. The present commercial process for the preparation of sodium sulfite involves crystallizing sodium sulfite from a boiling solution of sodium pyrosulfite. This present commercial process makes it extremely difficult to obtain a pure sodium sulfite because the resultant cyrstals are always coated with a solution of the mother liquor which is mainly sodium pyrosulfite. Accordingly, the method of the present invention further contemplates washing the sodium sulfite crystals obtained from the current commercial process with water, mixing the resultant wash water, preferably with the second dynamic plate, and drying the washed crystals with a warm gas, such as air, to decompose the wet pyrosulfite solution coating to sodium sulfite, sulfur dioxide and water. Of course, the sulfur dioxide and water are then removed by the main stream of sulfur dioxide-containing feed gas.

The invention accordingly comprises the several steps in the relation of one or more such steps with the respect to each of the others thereof, which will be exemplified in the method hereinafter disclosed, and the scope of the invention will be indicated in the claims.

DETAILED DISCUSSION

The method of removing sulfur dioxide from a gas containing the same comprises passing the gas over a plurality of dynamic plate means, each dynamic plate means comprising a 1–35%, by weight, aqueous solution of sodium pyrosulfite and sodium sulfite. The various aqueous solutions comprising the dynamic plate means of the present method are each prepared to include from 0.0–33.25% sodium pyrosulfite and from 0.85–25% sodium sulfite. The method is conducted at a pressure of approximately 1 atmosphere and at a temperature of 75°–155° F.

In order to more clearly define the operation and procedure of this invention, the examples which follow are given with regard to preferred embodiments for the removal of sulfur dioxide from a feed gas containing the same.

EXAMPLE I

A sulfur dioxide recovery system is constructed to include three dynamic plates. Each dynamic plate is defined by a single liquid scrubbing section. The first dynamic plate comprises a 30%, by weight, aqueous solution including 27.9% sodium pyrosulfite and 2.1% sodium sulfite. The second dynamic plate comprises a 25%, by weight, aqueous solution including 12.5% sodium pyrosulfite and 12.5% sodium sulfite. The third dynamic plate comprises a 20%, by weight, aqueous solution including 1% sodium pyrosulfite and 19% sodium sulfite. The sulfur dioxide recovery system is maintained at atmospheric pressure and at a temperature of 75° F.

A feed gas containing 2,760 ppm. sulfur dioxide is introduced into the sulfur dioxide recovery system at a rate of 126 ml. per minute. The sulfur dioxide content of the feed gas is determined as it exhausts from each of the three dynamic plates with the following results:

| Dynamic Plate No. | Initial $SO_2$ (ppm) | Dynamic Plate Composition | Exhaust $SO_2$ (ppm) | Total $SO_2$ Removed % |
|---|---|---|---|---|
| 1. | 2760 | 27.9% sodium pyrosulfite 2.1% sodium sulfite 70% water | 1510 | 42.03 |
| 2. | 1510 | 12.5% sodium pyrosulfite 12.5% sodium sulfite 75% water | 200 | 92.75 |
| 3. | 200 | 1% sodium pyrosulfite 19% sodium sulfite 80% water | 28.4 | 98.97 |

While the above example contemplates the use of three distinct liquid scrubbing sections, it is to be understood that this is done solely for purposes of experimental control. Accordingly, it is to be understood that the method of the present invention may be conducted utilizing any applicable apparatus, including, but not limited to, a vertical countercurrent scrubbing tower, a countercurrent cross-flow system using sprays and a suitable packing, or a liquid distribution system.

As previously stated, Example I is conducted at atmospheric pressure, at a temperature of 75° F. and at a gas flow rate of 126 ml. per minute. The three aqueous solutions represent three dynamic plates which are equivalent to 91.5% of a theoretical plate at that pressure, temperature and gas flow rate. The equilibrium value of sulfur dioxide at the center section, or second dynamic plate in Example I, is approximately 80 ppm. This then represents 1510 minus 80, or 1430, ppm. sulfur dioxide which would be removed by one theoretical plate. Since the exit concentration of the second dynamic plate was 200 ppm., that plate has removed 1310 ppm. sulfur dioxide. This in turn represents 91.5% efficiency. Therefore, at 75° F., the three dynamic plates are equivalent to 3 times 0.915, or 2.75, theoretical plates. It follows then that if the efficiency of three theoretical plates was desired, four such dynamic plates would have to be utilized, and would give the efficiency of 3.66 theoretical plates.

EXAMPLE II

A sulfur dioxide recovery system is constructed to include three dynamic plates comprising a countercurrent crossflow system wherein the sulfur dioxide absorber comprises a substantially saturated sodium sulfite-sodium pyrosulfite liquor. The first dynamic plate comprises 4%, by weight, sodium sulfite and 96%, by weight, sodium pyrosulfite. The second dynamic plate comprises 84.2%, by weight, sodium sulfite and 15.8%, by weight, sodium pyrosulfite. The third dynamic plate comprises 92.5%, by weight, sodium sulfite and 7.5%, by weight, sodium pyrosulfite. The system is maintained at atmospheric pressure and at a temperature of 130° F.

A feed gas containing 3,600 ppm. sulfur dioxide is introduced into the system, and the sulfur dioxide content of the feed gas is determined as it exhausts from each of the three dynamic plates with the following results:

| Dynamic Plate No. | Initial $SO_2$ (ppm) | Dynamic Plate Composition | Exhaust $SO_2$ (ppm) | Total $SO_2$ Removed % |
|---|---|---|---|---|
| 1. | 3600 | 4% sodium sulfite 96% sodium pyrosulfite | 1480 | 41.1 |
| 2. | 1480 | 84.2% sodium sulfite 15.8% sodium pyrosulfite | 300 | 91.6 |
| 3. | 300 | 92.5% sodium sulfite 7.5% sodium pyrosulfite | 20 | 99.4 |

EXAMPLE III

In order to demonstrate the ancillary process for obtaining the pure sodium sulfite necessary for efficient operation of the sulfur dioxide recovery system, as discussed hereinabove, the following experiment may be conducted.

A 45%, by weight, solution of sodium pyrosulfite is heated to boiling, and about 5%, by weight, sodium sulfite crystals are added. The solution is heated for approximately 20 minutes until substantial quantities of sodium sulfite crystals are formed as a slurry.

This slurry is vacuum filtered, and a sample of the crystals is dissolved to form a 1%, by weight, solution. At 75° F. the pH of this solution is approximately 7.0.

The remaining crystals are washed with tap water. At 75° F. the pH of a 1%, by weight, solution of the washed crystals is approximately 7.5.

Small amounts of the pH 7.0 and pH 7.5 crystals are separately dried glass vessels at 225° F. for 20 minutes.

Two 1%, by weight, solutions of the dried crystals are prepared and their pH is determined. The pH 7.0 crystals will be pH 7.7. The pH 7.5 crystals will be pH 7.85.

From these 1% pH values it is apparent that simple washing increases the purity of the sodium sulfite from 65 to 89%. Similarly, drying the washed crystals increases the purity of the sodium sulfite from 89% to about 95%. This significant increase in purity is accomplished by decomposing the pyrosulfite mother liquor which adheres to the sodium sulfite crystals. That is to say, significant quantities of mother liquor on the outside of the sodium sulfite crystals is removed by washing, heating and drying.

It will thus be seen that the objects made apparent from the preceding description are efficiently attained, and since certain changes may be made in carrying out the above method without departing from the scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

Now that the invention has been described,
What is claimed is:

1. A method for removing sulfur dioxide from a gas containing the same, said method comprising: passing said gas through an aqueous absorption system of at least three theoretical plates having varying concentrations of sodium pyrosulfite and sodium sulfite from the gas inlet to the gas outlet thereof, the sodium pyrosulfite concentration increasing progressively from the said gas outlet to said gas inlet and the combined sodium sulfite-sodium pyrosulfite concentration at any point in the absorption system being in the range of 1 to 35 percent by weight, and the final concentration of said absorbent solution through which said gas passes through being 0.0–1 percent by weight of sodium pyrosulfite and 0.84–25 percent by weight of sodium sulfite, wherein the sodium sulfite in said solution is obtained by heating a solution of sodium pyrosulfite to expel sulfur dioxide therefrom whereby a slurry of sodium sulfite crystals is formed, removing said crystals from said slurry and washing said crystals with water to remove mother liquor therefrom; said absorption of sulfur dioxide being effected while maintaining a pressure of approximately one atmosphere and a temperature of 75°–155° F in said absorption system, whereby substantially all of said sulfur dioxide is removed from said gas.

2. The method of claim 1 wherein the absorbent solution with which said gas initially comes into contact has a concentration of 21.25–33.25 percent by weight of sodium pyrosulfite and 1.75–3.75 percent by weight of sodium sulfite.

3. The method of claim 1 wherein said initial solution contains 27.9% sodium pyrosulfite and 2.1% sodium sulfite.

4. The method of claim 3 wherein said final solution contains 1% of sodium pyrosulfite and 19% of sodium sulfite.

5. The method of claim 1 wherein said final solution contains 1% of sodium pyrosulfite and 19% of sodium sulfite.

6. The method of claim 1 wherein said absorption is conducted at 75° F.

7. The method of claim 1 wherein said sulfur dioxidecontaining gas is passed:
  a. through an aqueous solution containing 21.25–33.25 percent by weight of sodium pyrosulfite and 1.75–3.75 percent by weight of sodium sulfite;
  b. then through an intermediate aqueous solution containing 9–19.5 percent by weight of sodium pyrosulfite and 10.5–12.5 percent by weight of sodium sulfite; and
  c. then finally through an aqueous solution containing 0–1 percent by weight of sodium pyrosulfite and 0.85–25 percent by weight of sodium sulfite.

8. The method of claim 7 wherein said initial solution contains 27.9% of sodium pyrosulfite and 2.1% of sodium sulfite.

9. The method of claim 7 wherein said intermediate solution contains 12.5% of sodium pyrosulfite and 12.5% of sodium sulfite.

10. The method of claim 7 wherein said final solution contains 1% of sodium pyrosulfite and 19% of sodium sulfite.

11. The method of claim 7 wherein said absorption is conducted at a temperature of 75° F.

* * * * *

UNITED STATES PATENT OFFICE
CERTIFICATE OF CORRECTION

Patent No. 3,991,162      Dated November 9, 1976

Inventor(s) James A. Taylor

It is certified that error appears in the above-identified patent and that said Letters Patent are hereby corrected as shown below:

Column 1, line 13: In the formula, "$NA_2S_2O_5$" should read --$Na_2S_2O_5$--.

Signed and Sealed this

First Day of March 1977

[SEAL]

Attest:

RUTH C. MASON
*Attesting Officer*

C. MARSHALL DANN
*Commissioner of Patents and Trademarks*